Figures 1, 2:
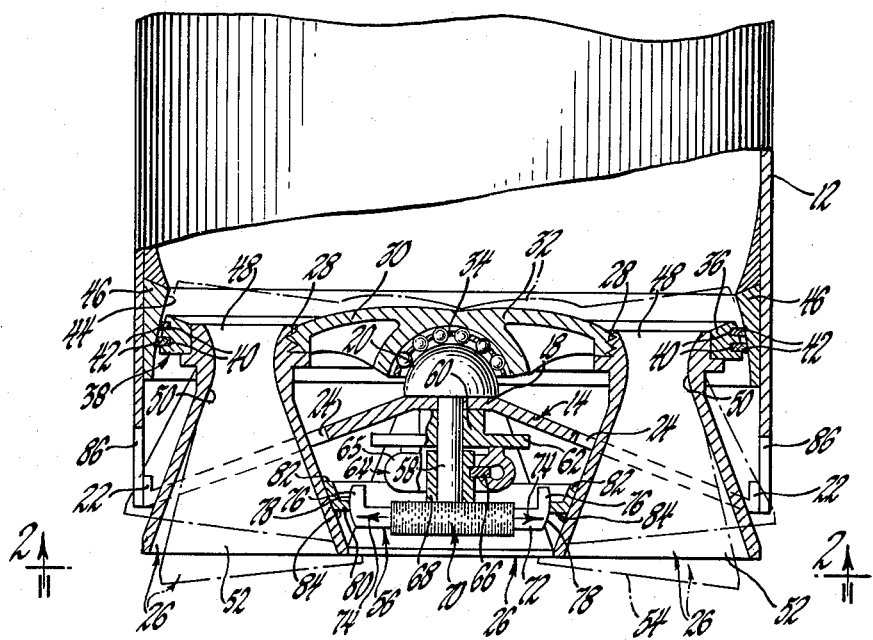

Sept. 8, 1964 J. C. McEWEN 3,147,591
SWIVELING FLUID JET EXHAUST NOZZLE CONSTRUCTION
Filed Dec. 28, 1961

INVENTOR.
John C. McEwen
BY
Robert E. McCollum
ATTORNEY though the preferred embodiment of the invention has been illustrated and described in detail, it will be apparent to those skilled in the art that various changes may be made.

United States Patent Office
3,147,591
Patented Sept. 8, 1964

3,147,591
SWIVELING FLUID JET EXHAUST NOZZLE CONSTRUCTION
John C. McEwen, Indianapolis, Ind., assignor to General Motors Corporation, Detroit, Mich., a corporation of Delaware
Filed Dec. 28, 1961, Ser. No. 162,676
4 Claims. (Cl. 60—35.55)

This invention relates to an attitude control arrangement for a missile or the like and more particularly to a vectoring fluid jet exhaust nozzle construction for controlling the direction of flight of a missile.

In large missiles or rocket motors where more than one fixed or nonorienting jet exhaust nozzle is used to provide more uniform pressure distribution and gas flow and control, additional side thrust nozzles are usually provided for changing the direction of flight of the missile. However, this adds to the weight of the missile and increases the complexity of the control system. Missiles having several individually vectored main nozzles require an even more complicated control system to provide the proper missile attitude control.

This invention eliminates the above disadvantages by grouping together several fixed exhaust nozzles and universally mounting the nozzles as a unit at the exhaust end of a reaction motor type missile so that the missile flight path can be changed merely by swiveling the entire nozzle unit to a new angular position.

Therefore, it is an object of this invention to provide an exhaust nozzle construction for a missile or the like providing infinitesimal control of the attitude of the missile.

It is a further object of the invention to mount all of the exhaust nozzles on the aft end of a missile or the like to pivot as an integral unit so that upon pivotal movement of the unit, the exhaust gases will be discharged from the nozzles all in the same direction and at an angle to the axis of the missile providing a jet turning force about the center of gravity of the missile.

Other objects, features and advantages will become apparent upon reference to the succeeding detailed description of the invention and to the drawings illustrating the preferred embodiment thereof; wherein, FIGURE 1 is a top view of the exhaust end of a missile embodying the invention with parts broken away and in section, and FIGURE 2 is an end view taken on a plane indicated by and viewed in the direction of the arrows 2—2 of FIG. 1.

In general, the invention relates to a rocket exhaust nozzle construction having four nonvectoring convergent-divergent exhaust nozzles symmetrically spaced about the rocket axis and secured as a group to a wobble plate so as to be nonmovable relative to each other, the plate being universally mounted on a rigid support member fixed to the rocket casing and closing the outlet end of the rocket. The rocket is steered by pivoting the wobble plate about the axis of the rocket to orient the nozzles in a direction to provide an exhaust gas jet turning force about the center of gravity of the missile.

More specifically, FIG. 1 shows the aft end of an annular thin metal rocket casing 12 partially closed by an annular rigid support member 14. Member 14 consists of four flat spoke-like struts 16 arranged 90° apart and having a common hub 18 at their inner ends. Hub 18 has a semi-spherical bearing surface 20 on one side for a purpose to be described later. The four struts extend diagonally outwardly to the casing 12 and are secured to it by flanges 22. The struts are fan shaped in cross section (FIG. 2) and circumferentially spaced to provide four substantially circular openings 24 through which project four convergent-divergent jet exhaust nozzles 26.

The four nozzles 26 are threadedly mounted in four openings 28 in an annular wobble plate 30. The hub 32 of the plate is universally mounted on the semi-spherical surface 20 by means of bearings 34. The outer edge of plate 30 is secured within a ring 36 constituting the movable portion of a sliding face contact type fluid seal 38. Ring 36 is grooved at 40 to receive two annular carbon seals 42, the seals frictionally and slidably engaging an annular spheroidal surface 44 of a ring 46. Ring 46 constitutes the stationary portion of seal 38, and is secured to the casing 12 by welding or the like. Each of the nozzles 26 is of the nonorienting convergent-divergent type having a converging inlet section 48, a throat or venturi 50, and a diverging conical exit portion 52.

As thus far described, all four nozzles are rigidly secured to wobble plate 28 so as to be nonmovable relative to each other, but, however, are movable as a unit with plate 30 and ring 32. Therefore, pivotal movement or oscillation of the wobble plate about the spherical surface 20 pivots both the nozzles 26 and ring 36 to the position indicated by dotted lines 54 in FIG. 1, for example, the carbon ring seals 42 sliding on the stationary spherical surface 44. The exhaust gases, therefore, are discharged from the nozzles in a direction at an angle to the axis of the rocket providing a jet turning force about the center of gravity (not shown) of the missile to steer the missile in the desired direction.

The wobble plate 30 and nozzles 26 are pivoted about the spherical surface 20 by an operating mechanism indicated generally at 56. More specifically, hub 18 of support member 14 is formed with a stub shaft 58 upon which is fixedly secured the hub 60 of an annular plate 62. Secured to plate 62 and surrounding shaft 58 is a circular solenoid 64. The solenoid has a circumferentially movable armature 65 keyed by a connection 66 to the sleeve shaft 68 of a second solenoid 70 rotatably mounted on shaft 58. The armature 72 of solenoid 70 extends out of both ends of the solenoid, and is movable linearly in either of two directions as indicated by the arrows 74, the outward movement from one end effecting movement into the solenoid at the opposite end. Armature 72 has a lip flange 76 at opposite ends, the flanges each having a spheroidal surface 78 abutting diametrically opposite portions of a nozzle actuating ring 80. Ring 80 is formed with an annular flange 82 welded or otherwise secured to each of the nozzles 26 at 84, as best seen in FIG. 1.

Thus, rotation of solenoid 70 by solenoid 64 followed by movement of armature 72 in either direction radially and arcuately moves all of the nozzles 26 as a unit to pivot wobble plate 30 about surface 20, the carbon ring seals 42 sliding on surface 44. Spheroidal surface 78 of the ring flange 82 permits the arcuate movement of the nozzles while maintaining a sliding contact between the flange and ring 80 at all times. It will be seen, therefore, that the solenoid 70 can be rotated to any position around ring 80 positioning armature 72 to move the nozzles in any direction. It should be noted that the downstream edge of the rocket casing 12 is cut back or relieved at 86 opposite each of the nozzle openings 24 in the support member 14 to provide sufficient clearance for extreme vectoring of the nozzles.

The controls for electrically energizing both of the solenoids 64 and 70 are not shown since known types may be used and the details thereof are believed to be unnecessary for an understanding of the invention. Suffice it to say, however, that a suitable control system is activated in response to a signal from a missile attitude sensitive device, such as, for example, a gyroscope (not shown) located in a forward compartment of the missile, to sequentially energize both solenoids 64 and 70 to provide the desired vectoring of the nozzles.

During normal operation, and while the missile is on its scheduled flight path, the nozzles 26 will be in their unvectored position shown in solid lines in FIG. 1 providing a pure axial thrust to the rocket or missile. When a signal is received by the control system indicating that the missile is not on course, solenoid 64 is energized rotating its armature 65, key 66 and sleeve shaft 68 of solenoid 70 to rotate solenoid 70 to the position called for by the attitude control. For convenience, the face 88 of plate 62 may be numbered, as shown in FIG. 2, to simulate the face of a clock. Thus, for example, energization of solenoid 64 causes solenoid 70 to be rotated to the 3 and 9 o'clock positions. Solenoid 70 is then energized to move its armature 72 against ring 80, at say, the 3 o'clock position of the ring, to pivot all four nozzles simultaneously about the bearing surface 20. The nozzles are thus moved laterally and angularly with respect to their previous positions. The exhaust gases will therefore now be discharged in a direction at an angle to the axis of the rocket to provide a force acting about the center of gravity of the missile to turn the missile back towards its scheduled flight path. As the missile approaches the scheduled flight path, the solenoids 64 and 70 will be energized automatically in the proper sequence either intermittently or continuously to change the angularity of the nozzles and slowly return the rocket to the correct path.

From the foregoing therefore, it will be seen that the invention provides infinitesimal control of the attitude of a missile merely by pivoting a plate to which the nozzles are fixed to a new position to change the angle of discharge of the exhaust gases from the nozzles. The nozzles afford a direct steer in any direction and assure immediate response, thus eliminating the need for guidance computation.

While the nozzles have been indicated as being moved by electrically actuated mechanisms, it will be clear that other suitable operating mechanisms could be used therefor, such as, for example, hydraulically operated devices providing the rotation and reciprocation necessary to properly vector the nozzles.

It is also to be understood that while the invention has been illustrated installed for use in a rocket, in the figures it will be clear to those skilled in the art to which this invention pertains, that it would have use in many installations other than that illustrated, and that changes and modifications may be made thereto without departing from the scope of the invention.

I claim:

1. A vectoring nozzle construction for a fluid reaction motor duct comprising an annular closure member secured to and across one end of said duct and having a plurality of openings therein, a plurality of fluid jet exhaust nozzles fixedly secured together and each projecting through one of said openings, said nozzles being mounted as a unit on said member for a swivel movement with respect thereto, and means to move said nozzles, said means including a ring between said nozzles and secured to each, and actuating means mounted on said closure member engaging said ring to move said ring and nozzles about said closure member to control the attitude of said motor by controlling the direction of discharge of the exhaust fluid from said nozzles.

2. A vectoring nozzle construction for a fluid reaction motor duct comprising an annular closure member secured to and across one end of said duct and having a plurality of openings therein, a plurality of fluid jet exhaust nozzles fixedly secured together each projecting through one of said openings, said nozzles being mounted as a unit on said member for a swivel movement with respect thereto, and means to move said nozzles, said means including a ring surrounded by said nozzles and secured to each, and actuating means mounted on said closure member movable selectively to engage different portions of said ring to move said ring and nozzles in a plurality of different directions about said closure member to control the attitude of said motor by controlling the direction of discharge of the exhaust fluid from said nozzles.

3. A vectoring nozzle construction for a fluid reaction motor duct comprising an annular closure member secured to and across one end of said duct and having a plurality of openings therein, a plurality of fluid jet exhaust nozzles fixedly secured together and each projecting through one of said openings, said nozzles being mounted as a unit on said member for a swivel movement with respect thereto, and means to move said nozzles, said means comprising a ring surrounded by said nozzles and secured to each, and actuating means rotatably mounted on said closure member, said actuating means including reciprocating means engaging said ring to move said ring and nozzles in a plurality of different directions about said closure member to control the atttiude of said motor by controlling the direction of discharge of the exhaust fluid from said nozzles.

4. A vectoring nozzle construction for a fluid reaction motor duct comprising an annular closure member secured to and across one end of said duct and having a plurality of openings therein, a plurality of fluid jet exhaust nozzles each projecting through one of said openings, support means mounting said nozzles on said member for a swivel movement as a unit with respect thereto, said support comprising an annular wobble plate having a universal connection with said member within said duct, means fixedly securing said nozzle to said plate through a plurality of holes therein, said duct and periphery of said support each having relatively movable fluid sealing portion thereon cooperating to prevent the passage of fluid therepast and means to move said nozzles, said means comprising a ring surrounded by said nozzles and secured to each, and reciprocating actuating means rotatably mounted on said closure member engaging said ring to move said ring and nozzles in a plurality of different directions about said closure member to control the attitude of said motor by controlling the direction of discharge of the exhaust fluid from said nozzles, and means to move said reciprocating means in one direction in response to rotation of said actuating means to move said ring.

References Cited in the file of this patent

UNITED STATES PATENTS

| 2,933,889 | Tolkmitt | Apr. 26, 1960 |
| 3,049,877 | Sherman | Aug. 21, 1962 |
| 3,056,258 | Marchant et al. | Oct. 2, 1962 |

FOREIGN PATENTS

| 160,981 | Australia | Sept. 25, 1952 |